United States Patent [19]

Reed

[11] Patent Number: 5,564,006

[45] Date of Patent: Oct. 8, 1996

[54] REAL TIME TRANSFORMATION BETWEEN COLOR SPACES

[75] Inventor: Alastair M. Reed, Delta, Canada

[73] Assignee: Cymbolic Sciences International, Inc., Laguna Hills, Calif.

[21] Appl. No.: 251,689

[22] Filed: May 31, 1994

Related U.S. Application Data

[63] Continuation-in-part of Ser. No. 531,897, Jun. 1, 1990.

[51] Int. Cl.⁶ .................................................. G06F 15/00
[52] U.S. Cl. .................... 395/161; 358/518; 358/523
[58] Field of Search .................... 395/127, 128, 395/129, 130, 131; 358/515, 516, 517, 518, 519, 520, 523, 525, 526, 521, 522

[56] References Cited

U.S. PATENT DOCUMENTS

| | | | |
|---|---|---|---|
| 4,334,240 | 6/1982 | Franklin | 358/525 |
| 4,511,989 | 4/1985 | Sakamoto | 345/154 |
| 4,561,016 | 12/1985 | Jung et al. | 358/527 |
| 4,879,594 | 11/1989 | Stanfield et al. | 358/518 |
| 4,975,769 | 12/1990 | Aigu et al. | 358/517 |
| 4,992,862 | 2/1991 | Gabor | 358/518 |

FOREIGN PATENT DOCUMENTS

| | | |
|---|---|---|
| 0184289 | 6/1986 | European Pat. Off. . |
| 0309224 | 3/1989 | European Pat. Off. . |
| 2050751 | 1/1981 | United Kingdom . |
| 2217140 | 10/1989 | United Kingdom . |

*Primary Examiner*—Mark R. Powell
*Assistant Examiner*—Huynh Ba
*Attorney, Agent, or Firm*—Elbie R. de Kock

[57] ABSTRACT

A method of transforming an input pixel comprising independent and dependent color components into an output pixel comprising independent colors only or a mixture of independent and dependent colors, is provided. The method comprises the steps of resolving each dependent input color component in independent color components and combining these components with the corresponding independent input components according to a correction model to correct for additivity failure in printing inks. An apparatus for carrying out the method is also provided.

7 Claims, 7 Drawing Sheets

SPECIAL COLOUR 2

5,564,006

REAL TIME TRANSFORMATION BETWEEN COLOR SPACES

CROSS REFERENCE TO RELATED APPLICATIONS

This application is a continuation-in-part of pending U.S. application Ser. No. 07/531,897 filed Jun. 1, 1990, the entire contents of which is incorporated herein by reference.

FIELD OF THE INVENTION

This invention relates to real time transformations between vector spaces. In particular, it relates to vector spaces that represent colors as used in the graphic arts and printing industries.

BACKGROUND OF THE INVENTION

An n-dimensional vector space can be completely described by any set of "n" independent vectors. In general, the choice of a particular set of independent vectors is made for purposes of convenience. As an example, the same physical space may be described in terms of linear coordinates (x, y, z) for objects undergoing linear motion and radial coordinates (r, Θ, z) for objects undergoing radial motion.

To transform coordinate descriptions between two vector spaces one may employ either transformation equations or empirical data tables, also known as "look-up tables" with the possible further step of interpolating between table entries. The method chosen depends on the circumstances. If simple transformation equations exist then these can be employed. However, often such equations are complicated, in which case the look-up table method should be considered. Look-up tables will be most easily applied to a finite vector space requiring only limited precision. As precision requirements increase, the table must either grow tremendously or else interpolation equations must be employed. There is a balance to be struck between the complexity of the interpolation equations and the exhaustiveness of the data table.

Vector spaces representing color are a specific example. It is now generally agreed that any color can be completely described by a three-dimensional vector space. That is to say, three independent colors can be combined to create all other colors. Two sets of colors are illustrative. For objects that are sources of light (such as color television sets) the traditional set of independent colors used is red, green and blue or RGB (the additive primary colors). For objects that absorb light, such as dyes, inks and paints, the traditional set of independent colors used is cyan, magenta and yellow or CMY (the subtractive primary colors).

Color printing is normally carried out using three or more ink colors. Usually four printing inks known as the "process colors" (cyan, magenta, yellow and black or CMYK) are used. While inks combine in a predictable, repeatable way, the relationships are nonlinear. Therefore, black ink is frequently used directly (instead of indirectly as a combination of the CMY inks) because black is usually an important color that must be precisely controlled.

Sometimes, particularly in the packaging industry, "non-process" inks are used to directly control specific colors, such as brown or orange, that may be important in a given printing. As with the use of black ink, these non-CMY inks are used by the printer to keep better control of the printing process and to obtain a better color match on the final printed result.

FIG. 1 illustrates a typical color printing installation in block diagram form. A color transparency 10 is entered into the color printing system using an input device, such as a scanner 14. A scanned image is manipulated using a page composition system 16. Intermediate results can be viewed on such proofing devices 18 as a monitor 20 (at low resolution), a digital film recorder 21 (at high resolution) or an ink jet printer 22. The final product can be printed on a color printing device 24.

FIG. 1 also illustrates a major complication in the printing process, i.e. color space transformations. The fact that different devices in a color printing installation work with different color space descriptions necessitates the use of color converters 26, 28, 29 and 30 between devices.

Although color space is three dimensional, FIG. 1 illustrates transformations between larger coordinate systems. The transformation at 26 is from three space to five space. The transformations 28 and 29 are from five space to three space. The transformation at 30 is from five space to four space. These more complicated transformations necessitated by the physical properties of printing inks involve mathematically superfluous dependent basis vectors as well as the three independent basis vectors required to describe color space.

There are three cases to consider. First, the case where a color space defined in terms of only independent basis vectors is transformed into a color space defined in terms of both independent and dependent basis vectors. Second, the case where a color space defined in terms of both independent and dependent basis vectors is transformed into a color space defined in terms of only independent basis vectors. Third, the general case where a color space defined in terms of both independent and dependent basis vectors is transformed into a color space defined in terms of both independent and dependent basis vectors.

In the first case, the conventional transformation method is to input the original vector into a look-up table to determine the image vector in terms of only the independent basis vectors. These independent components are then further processed using color extraction optimising algorithms, such as those described in U.S. Pat. No. 4,879,594, to produce the dependent components and as a result to modify the independent components. As these algorithms are time consuming, real time processing is sacrificed using this method.

In the second case, the conventional transformation method is to use a look-up table with as many dimensions as there are basis vectors, dependent and independent, in the original vector space. This table can then directly supply the independent components of an image vector. This method tends to be impractical because look-up tables increase in size exponentially with each new input parameter and processing time for interpolation equations also increases dramatically with each new input parameter.

The third case is merely a combination of the first two cases. The same problems are applicable.

SUMMARY OF THE INVENTION

According to the invention, there is provided a method of transforming three independent input vectors representing independent colors and one or more dependent input vectors representing dependent colors, in an original vector space, to three independent vectors in an image vector space, comprising the steps of (a) resolving each dependent input vector into three independent vector components corresponding with said independent input vectors; (b) combining each independent vector with the corresponding independent vector component of a selected first one of said dependent input vectors according to a predetermined correction model to correct for additivity failure in printing inks to obtain a first output value for each independent color; (c) combining each of said first output values with the corresponding independent vector component of a selected second one of said dependent input vectors according to said correction model to obtain a second output value for each independent color; (d) repeating step (c) until all said dependent vectors are exhausted to obtain a final output value for each independent color to form a reduced set of three independent vectors; and (e) inputting said reduced set of three independent vectors into a three-dimensional look-up table for three-dimensional original vector space input data and containing three-dimensional image vector space output data to obtain the said three independent vectors in the image vector space.

Also according to the invention, there is provided a method of transforming three independent input vectors representing independent colors and one or more dependent input vectors representing dependent colors, in an original vector space, to three independent and one or more dependent vectors in an image vector space, in real time, comprising the steps of (a) resolving each dependent input vector into three independent vector components corresponding with Said independent input vectors; (b) combining each independent vector with the corresponding independent vector component of a selected first one of said dependent input vectors according to a predetermined correction model to correct for additivity failure in printing inks to obtain a first output value for each independent color; (c) combining each of said first output values with the corresponding independent vector component of a selected second one of said dependent input vectors according to said correction model to obtain a second output value for each independent color; (d) repeating step (c) until all said dependent vectors are exhausted to obtain a final output value for each independent color to form a reduced set of three independent vectors of an intermediate vector space; and (e) providing a look-up table for intermediate vector space input data and in which image vector space output data, in the form only of three independent vectors, have been processed ahead of time, into image vector space output data comprising modified three independent vectors and one or more dependent vectors, from which the required image vector space output data can be directly obtained; and inputting said intermediate vector space vectors into said look-up table to obtain said image vector space vectors.

Further according to the invention, there is provided a method of transforming three independent input vectors representing independent colors and one or more dependent input vectors representing dependent colors, in an original vector space, to three independent and one or more dependent vectors in an image vector space in real time, comprising the steps of (a) resolving each dependent input vector into three independent vector components corresponding with said independent input vectors; (b) combining each independent vector with the corresponding independent vector component of a selected first one of said dependent input vectors according to a predetermined correction model to correct for additivity failure in printing inks to obtain a first output value for each independent color; (c) combining each of said first output values with the corresponding independent vector component of a selected second one of said dependent input vectors according to said correction model to obtain a second output value for each independent color; (d) repeating step (c) until all said dependent vectors are exhausted to obtain a final output value for each independent color of an intermediate vector space; and (e) compiling a look-up table ahead of time, for intermediate vector space input data in the form only of independent vectors and containing image vector space output data in the form of independent and dependent vectors; and (f) inputting said intermediate vector space vectors into said look-up table, in real time, to obtain said image vector space vectors.

In this way, by employing the method according to the invention, it is possible to effect transformations between vector spaces involving both independent and dependent colors in real time.

Further according to the invention there is provided apparatus for transforming three independent input vectors representing independent colors and one or more dependent input vectors representing dependent colors, in an original vector space, to three independent vectors in an image vector space, comprising:
means for resolving each dependent input vector into three independent vector components corresponding with said independent input vectors;
means for combining each independent vector with the corresponding independent vector component of a selected first one of said dependent input vectors according to a predetermined correction model to correct for additivity failure in printing inks to obtain an intermediate output value for each independent color;
means for sequentially combining said intermediate output values with the corresponding independent vector component of selected further ones of said dependent input vectors according to said correction model to obtain further sequential output values for each independent color until all said dependent vectors are exhausted to form a reduced set of three independent vectors; and
transformation circuitry which comprises a look-up table for transforming the reduced set of three independent vectors to three independent vectors in an image vector space.

Also according to the invention there is provided apparatus for transforming three independent input vectors representing independent colors and one or more dependent input vectors representing dependent colors, in an original vector space, to three independent and one or more dependent vectors in an image vector space in real time, comprising:
means for resolving each dependent input vector into three independent vector components corresponding with said independent input vectors;
means for combining each independent vector with the corresponding independent vector component of a selected first one of said dependent input vectors according to a predetermined correction model to correct for additivity failure in printing inks to obtain an intermediate output value for each independent color;
means for sequentially combining said intermediate output values with the corresponding independent vector component of selected further ones of said dependent input vectors according .to said correction model to obtain further sequential output values for each independent color until all said dependent vectors are exhausted to form a reduced set of three independent vectors of an intermediate vector space; and
transformation circuitry which comprises a look-up table for transforming the reduced set of three independent vectors to independent and dependent vectors in an image vector space.

Said means for resolving each dependent input vector into an independent vector component and said means for combining said independent vector component with the corresponding independent input vector may comprise a two-dimensional look-up table for receiving input values of said dependent and independent vectors, said look-up table being loaded with said correction model to correct for additivity failure in printing inks.

Said correction model may comprise a cross product approximation for additivity failure in inks according to the formula:

$$A_1 = A_0 + A_k - a \times A_0 \times A_k$$

where,
$A_1$ is the first output value for an independent color A;
$A_0$ is the input value for independent color A;
$A_k$ is the corresponding independent vector component of a selected dependent input vector; and
a is a constant.

Other objects and advantages of the invention will become apparent from the description of a preferred embodiment of the invention below.

DESCRIPTION OF PREFERRED EMBODIMENT

Figure 1:
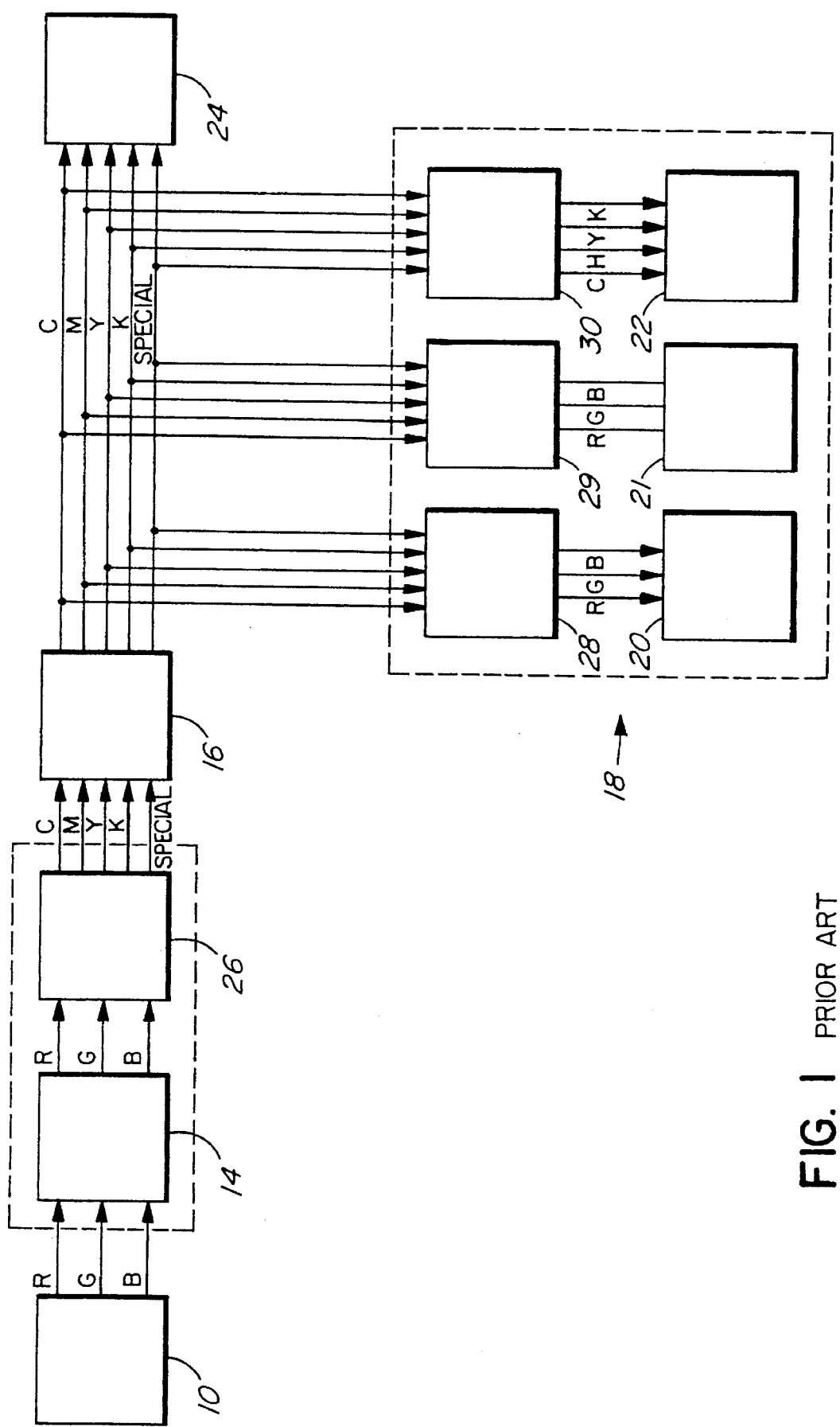
FIG. 1 is a block diagram of a typical color printing installation.
Figure 2:
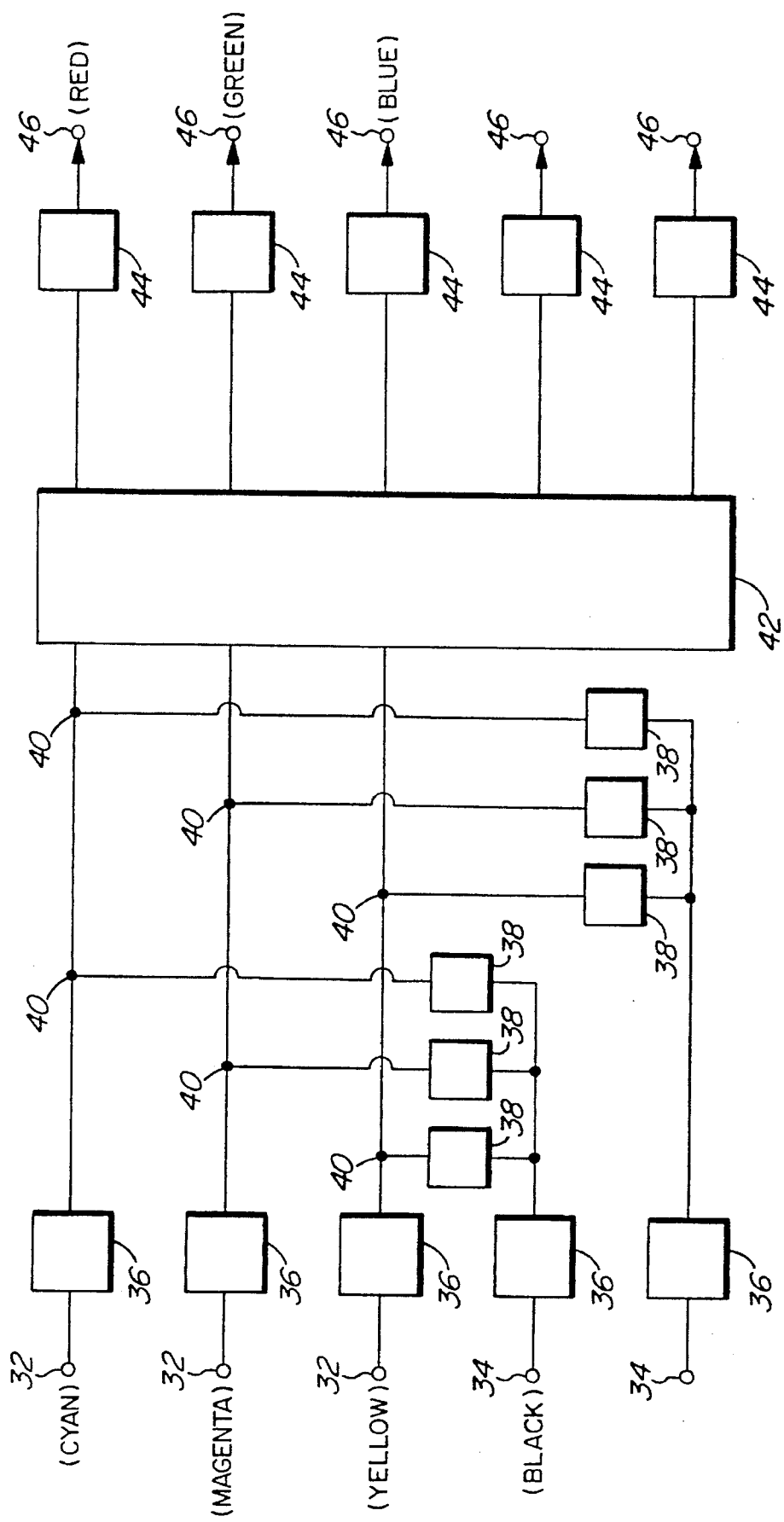
FIG. 2 is a block diagram of a color converter circuit that performs real time transformations between vector spaces that represent colors according to the method of the invention.

FIG. 2 illustrates a color converter circuit that performs real time transformations between color spaces. Digital input signals are classified as either coefficients of independent basis vectors 32 or coefficients of dependent basis vectors 34. The actual color converter circuit comprises prescalers 36, one-dimensional look-up tables 38, digital adders 40, the main transformation circuitry 42, and postscalers 44. The output signals are classified as either coefficients of independent basis vectors 46, or coefficients of dependent basis vectors 48.

OPERATION

FIG. 2 provides an overview of the operation of a color converter circuit that performs real time transformations between color spaces. All the input signals 32 and 34 are prescaled by the prescalers 36 so as to use the full range of the transformation circuitry 42. Each dependent basis vector component 34 is resolved into its three independent basis vector components by the three one-dimensional look-up tables 38. These components are then added to the appropriate independent basis vector components by the digital adders 40 and the sum is input into the transformation circuitry 42. The transformation circuitry 42 performs transformations in two stages. First, a coarse look-up table approximate transformation is obtained which is then refined by interpolation. Finally, the transformed digital signals are postscaled by the postscalers 44 to set them at an appropriate level.

As indicated in the illustrated example, a prescaler 36 is provided for each independent color and each dependent color being .input. The same applies to the postscalers 44 in respect of the number of independent and dependent colors being output. A set of three one-dimensional look-up tables 38 is provided for each dependant color being input. The transformation circuitry 42 is preprogrammed specifically to cater for the number of independent and dependent colors being output.

Before transformations can occur, a calibration is performed wherein measured intensities of a scanned color standard are compared with the actual standard intensities to produce transform pairs to be stored in the look-up table. Where the image vector comprises both independent 46 and dependent 48 basis vectors, optimised color extraction algorithms are used at this set-up stage to produce the transform pairs.

The use of optimised color extraction algorithms in programming a look-up table facilitates transformations into general image vector spaces which comprise dependent basis vectors. Prior art, such as U.S. Pat. No. 4,334,240 generally relied upon special relationships between specific colors to perform transformations into specific image spaces when dependent basis vectors were involved. U.S. Pat. No. 4,334,240 teaches that CMY can be mapped into CMYK based on the fact that black (K) intensity is always approximately equal to the lowest intensity among C, M, and Y.

Optimised color extraction algorithms generalize such special relationships. As taught in U.S. Pat. No. 4,879,594, geometric relationships between colors in a color cube can be employed to optimally describe a point in an image vector space in terms of both independent and dependent basis vectors.

The optimised color extraction algorithms are implemented as follows:

Consider an incoming pixel value of $C_0$, $M_0$, $Y_0$. The location of the closest or exact match of special color 1, defined by a point with coordinates $C_1$, $M_1$, $Y_1$ and special color 2 defined by a point with coordinates $C_2$, $M_2$, $Y_2$ is determined. This is achieved by successively extracting equal increments of special color 1 (0%, 1% etc.) in terms of the cyan, magenta and yellow components from the pixel color, until a first one of the pixel color components falls to zero. The cyan, magenta and yellow components for each value (0%, 1%, etc.) of the special color to be subtracted are obtained from the curves shown in FIGS. 5 and 6. The cyan, magenta and yellow values of that form of the special color 1 where one of the color components falls to zero then define the point $C_1$, $M_1$, $Y_1$. This process is repeated to determine the point $C_2$, $M_2$, $Y_2$.

Figure 4:
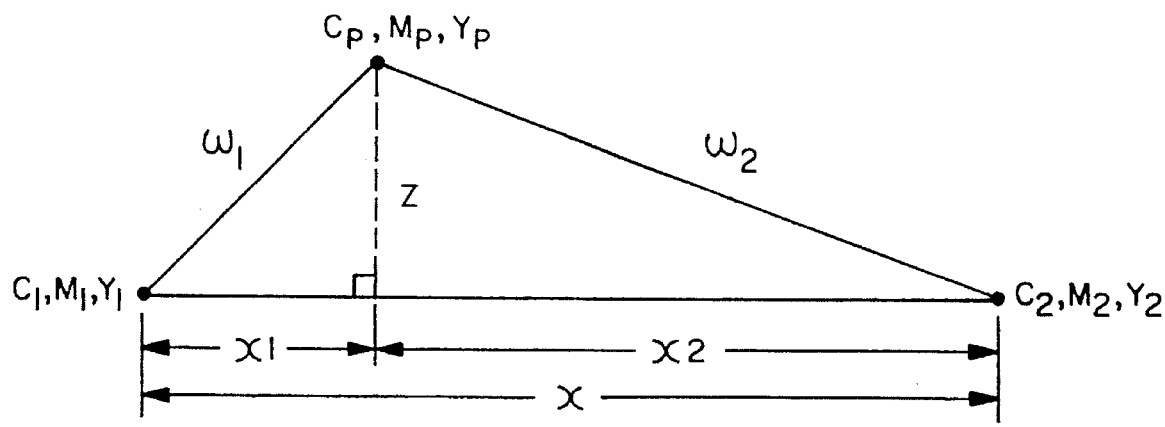
FIG. 4 illustrates a method for determining the proportions of special colors to be used.

A plane is then constructed in color space which passes through these three points which define a triangle with sides x, $w_1$, $w_2$ (see FIG. 4). A perpendicular is dropped from the pixel point to the line joining the two special color points, and the lengths of the two sections of the line with length x are then determined $(x_1, x_2)$ using Pythagoras' theorem. This gives:

$$x_1=(w_2^2-x^2-w_1^2)/2x$$

$$x_2=(x^2+w_2^2-w_1^2)/2x$$

The proportions $P_1$ and $P_2$ of special color 1 and special color 2 to extract are then given by $$P_1=x_2/(x_1+x_2)$$

$$P_2=x_1/(x_1+x_2)$$

Consider the following example in which the original pixel components and closest or exact matches of the special colors have the following values:

34% Special Color 1→25 C, 28 M, 20 Y

56% Special Color 2→0 C, 18 M, 70 Y

*Incoming Pixel*→25 C, 70 M, 70 Y

Figure 5:
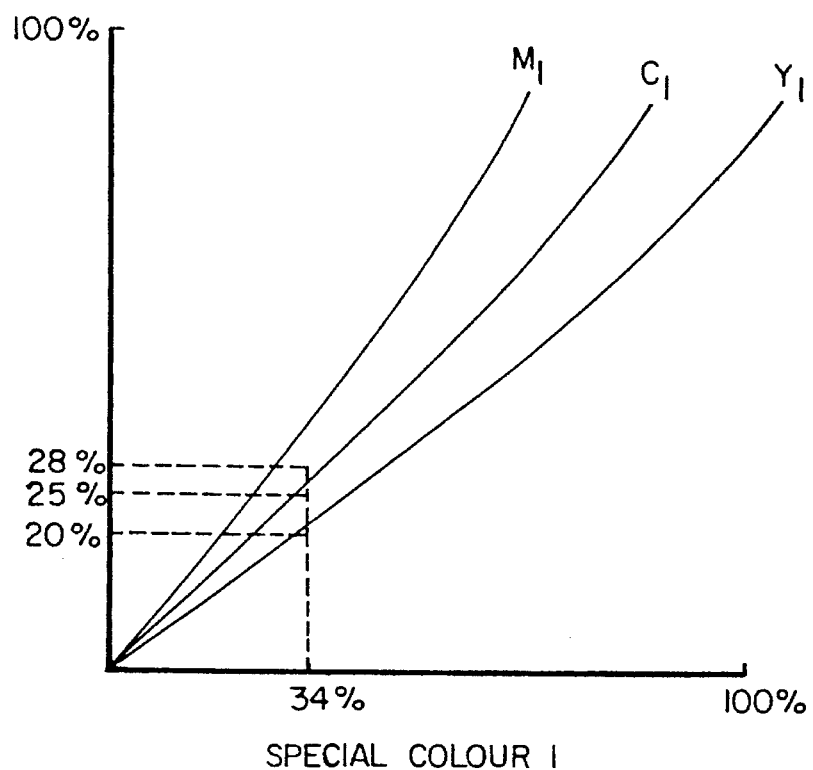
FIGS. 5 and 6 are graphical representations showing the values of the yellow, magenta and cyan components for different values of a special color, for two different special colors, respectively.
Figure 6:
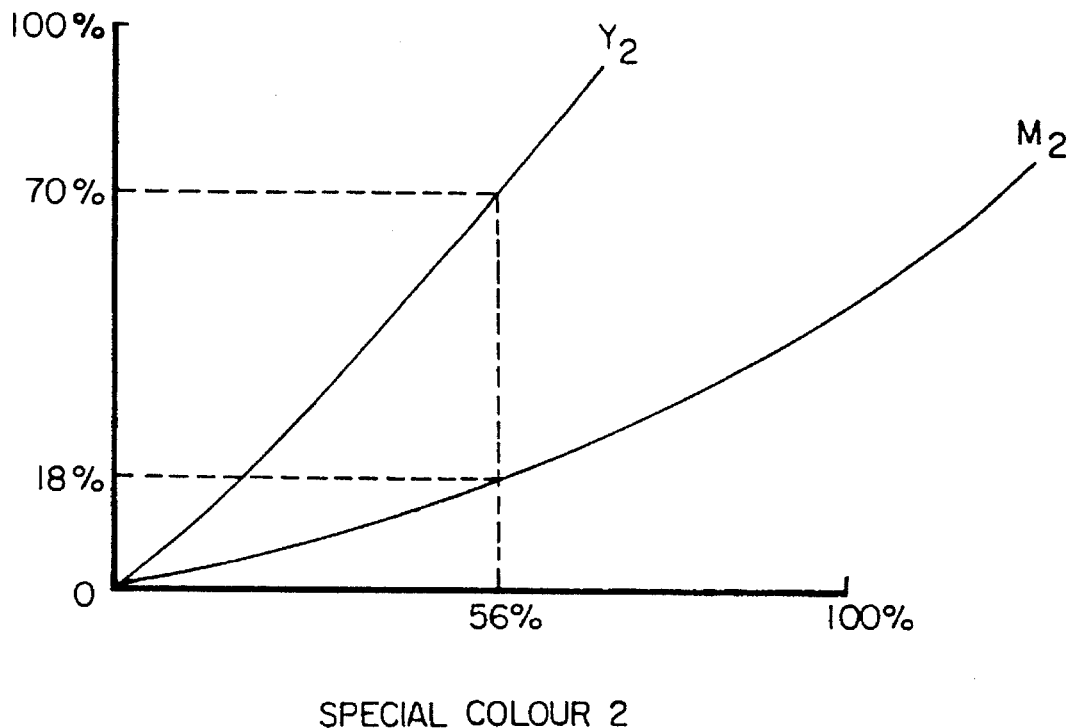

FIGS. 5 and 6 are graphical representations showing the values of the cyan, magenta and yellow components for different percentages (percent dot) of the special colors 1 and 2 of the present example, respectively. These curves show that for 34% of special color 1, the CMY components are 25, 28 and 20, respectively, and that for 56% special color 2, the CMY components are 0, 18 and 70, respectively.

In this example, special color 1 represents a dark brown, special color 2 a warm yellow, and the pixel is a brownish red. The values of x, $w_1$ and $w_2$ are determined using the formula above, which, in this example, yield:

$$x_1=36.6$$

$$x_2=20.2$$

$$P_1=0.355$$

$$P_2=0.645$$

The extraction proportions are ranked according to magnitude and subtracted in order of magnitude. Since $P_2>P_1$, special color 2 is extracted first, up to a value determined by the exact match percentage (56%) multiplied by the proportion of special color 2 to be extracted, i.e. 56*0.645=36%. This corresponds to cyan, magenta and yellow components of 0 C, 11 M, 40 Y to be extracted. After extraction this leaves residual components of 25 C, 59 M, 30 Y which is then extracted into special color 1. The above are all pre-calculated for a set of incoming pixel values, to obtain a 3 color in to 4 color out look-up table. This look-up table is used to perform the color transformation described above in real time hardware.

Figure 3:
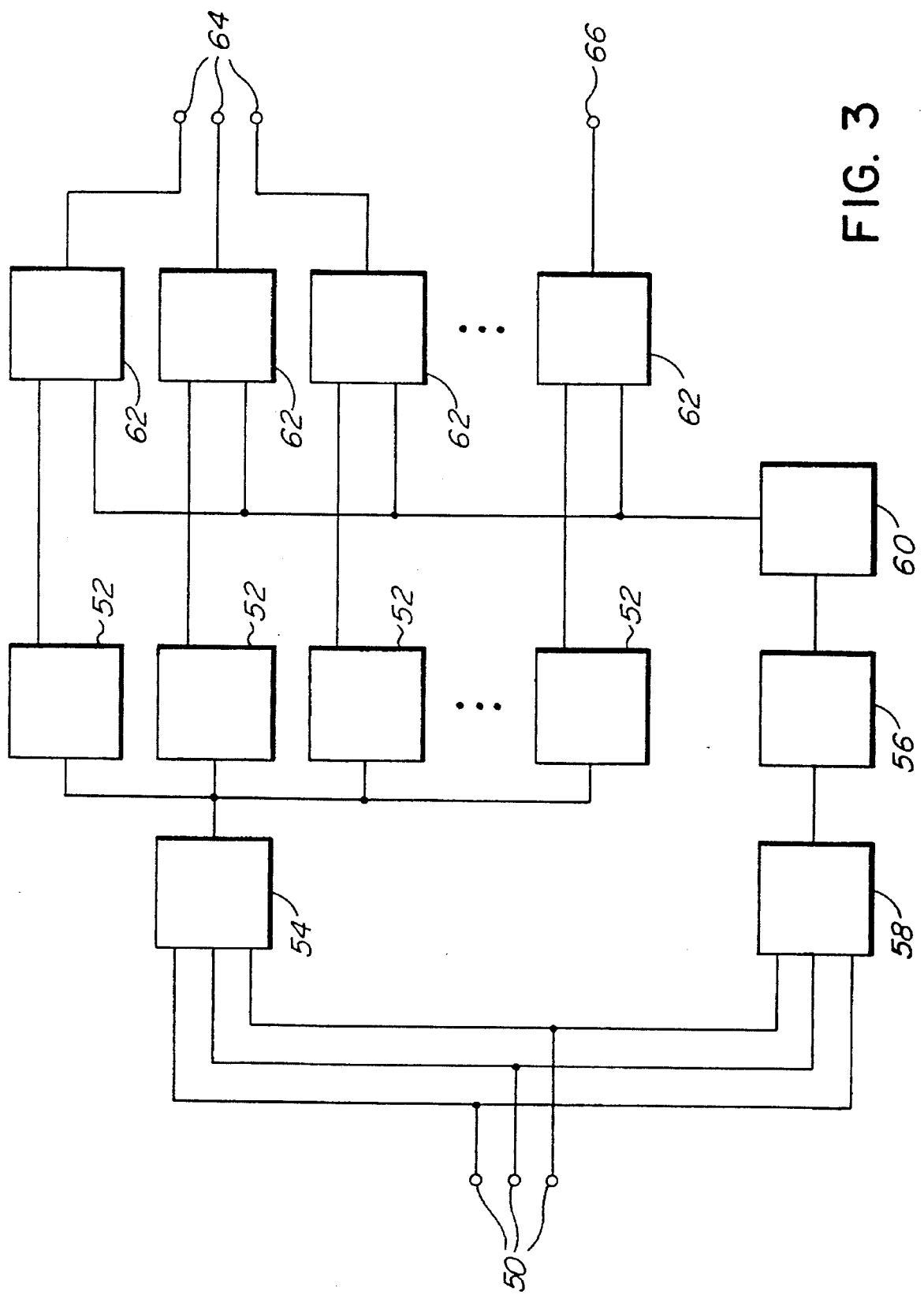
FIG. 3 is a logical block diagram of the workings of the main transformation circuitry according to the invention.

FIG. 3 illustrates the overall logical structure of the transformation circuitry 42. Three digital signals 50 representing independent color space vectors are inputted. These signals 50 are the signals that resulted from resolving the dependent vectors 34 into the independent vectors 32 in the previous circuitry.

To increase efficiency in processing time and data storage, the digital signals 50 indirectly address the three dimensional look-up tables 52 through the intervention of an address generation reference table 54. Each output image vector (whether independent or dependent) necessitates a dedicated three dimensional look-up table 52. These three dimensional look-up tables 52 are only coarsely filled with transform pairs so that only the more significant bits of each signal 50 are used at this stage.

The less significant bits of signals 50 are used in the interpolation process. Again to increase efficiency in processing time and data storage, these signals 50 indirectly address a fractional reference table 56 through an address generation reference table 58. This fractional reference table 56 contains precise constant approximations to fractions necessary in the interpolation process. The constant approximations selected from this table 56 are used at 60 to calculate the coefficients used in the interpolation equations.

Interpolation equations at 62 draw upon the coarse transform pair data selected from the three dimensional look-up tables 52 and the interpolation coefficients calculated at 60 to produce more precise image vectors. Independent image vectors are output at 64 while dependent image vectors are output at 66.

As can be seen above in the description of the implementation of the color extraction algorithms, the special colors are determined by determining extraction proportions (e.g. $P_1$, $P_2$) to be extracted from the independent colors ($C_0$, $M_0$, $Y_0$); ranking the special colors according to the magnitude of the extraction proportion (e.g. $P_2>P_1$); subtracting the special color with the largest extraction proportion first; and subtracting the special color with the next largest extraction proportion from the residual value; and so on, depending on the number of special colors involved.

In the description with reference to FIG. 2 in dealing with the case where the input to the color transformation circuitry 42 comprises both independent 32 and dependent vectors 34, it has been stated that each dependent basis vector component 34 is resolved into its three independent basis vector components by the three one-dimensional look-up tables 38. These tables would typically contain values obtained from curves such as those shown in FIGS. 5 and 6 stored in them. These resolved components are then added to the appropriate independent basis vector components by the digital adders 40 and then the sum is input into the transformation circuitry 42.

Figure 7:
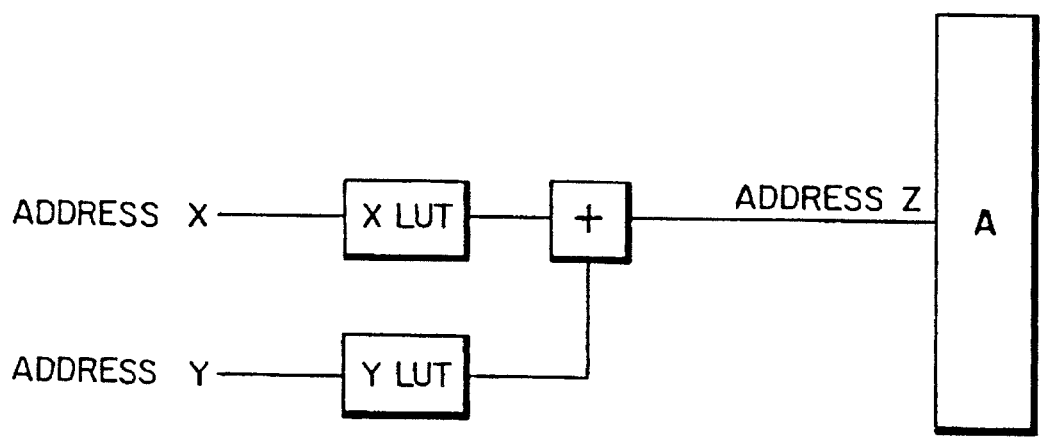
FIG. 7 is a simplified illustration of one embodiment of the color conversion method according to the invention.

The above example where there are three independent colors and two dependent colors can be compared with the simpler situation, shown in FIG. 7, where there is one independent color x and one dependent color y, the values x,y of which, after passing through prescalers 36, are added by digital adder 40 to obtain a resultant address z which is used to access a one-dimensional look-up table 43 to return the value A. However, the address z is not unique, since other values of x and y can also sum to z, which would also return the value A, which of course is undesirable. For example x=90, y=10 will address the same location as x=100, y=10. This method, as well as the analogous addition method described with reference to FIG. 2, will only work if the addresses x and y have the following properties:

(a) y is a function of x and the values returned from x and from y are both monotonically increasing or decreasing; and (b) y is a fixed function of x.

In practice a dependent ink which is resolved into its primary components only meets requirement (b) if a constant level of dependent color extraction is employed. Thus, if a dependent color, say black, is used, a constant level of black extraction must be used, otherwise the method will not be effective. Despite this limitation, it has been found that the method has useful practical application in certain instances. However, in order to increase the flexibility of the system, a further embodiment of the invention has been developed. This embodiment includes a modified special color inclusion algorithm which produces consistent results for images with different extraction algorithms. For example, in the case of black, images with different levels of black extraction can be output together in a single frame with a correct color match still being obtained.

In the first black inclusion method described with reference to FIG. 2, black is simply added into the cyan, magenta and yellow channels after passing through a one-dimensional look-up table. This method produces a good color match provided that the black extraction stays constant. This implies that images with different levels of black extraction cannot be output together in a single frame with a good color match, as stated above. The modified embodiment to be described in this part can cope with different levels of black extraction by reversing the black extraction algorithm. For example, a mid-grey color can be described by either of the following two sets of CMYK values:

(i) 50, 40, 40, 10, for a minimal skeleton black; or
(ii) 20, 10, 10, 50, for an image with under-color removal.

Using the modified embodiment, both the above sets of values can be mapped to 50, 50, 50 (which represents mid-grey), after black inclusion. With the first black inclusion method, the first set would have mapped to 60, 50, 50 and the second set would have mapped to 70, 60, 60, using color curves for black similar to those illustrated in FIGS. 5 and 6. Thus, it can be seen that with the first method consistent results for different black extraction algorithms are not possible.

Figure 8:
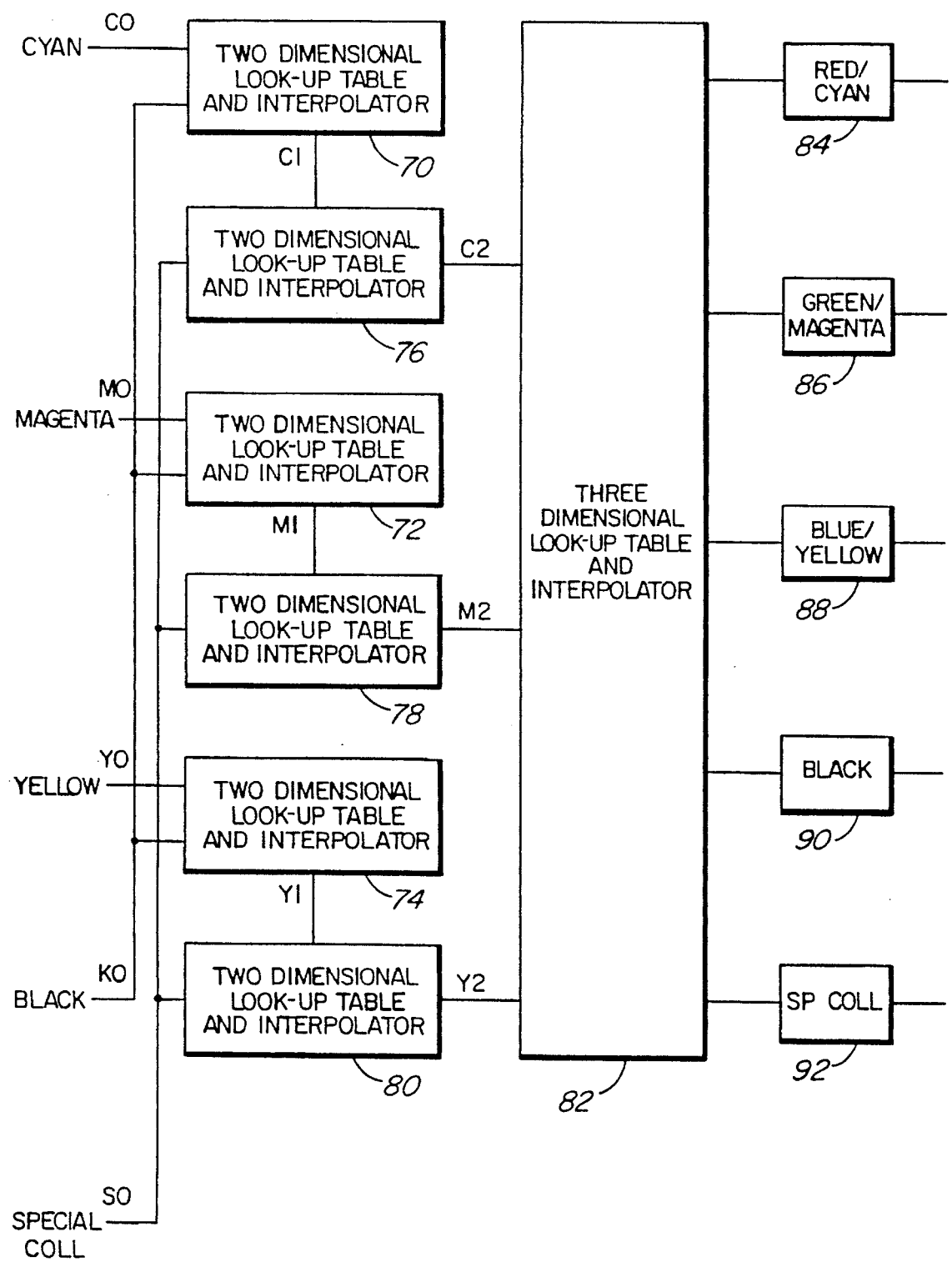
FIG. 8 is a block diagram illustration of a color conversion method according to another embodiment of the invention.

In order to achieve the above consistent results, the modified black inclusion method combines the black channel in a manner which models the printing process using a two-dimensional look-up table for black with cyan, black with magenta and black with yellow, as illustrated in FIG. 8. Thus, as shown, two-dimensional look-up tables 70, 72 and 74 are provided for black with each of cyan, magenta and yellow, respectively.

The method can also be extended to more than four input colors, e.g., for a further special color (S), as shown in FIG. 8. To accommodate the special color S, further two-dimensional look-up tables 76, 78 and 80 are provided in series with the look-up tables 70, 72 and 74, respectively.

In FIG. 8, reference numeral 82 refers to the color transform circuitry which comprises a three-dimensional look-up table and interpolator, as before. Reference numerals 84, 86, 88, 90 and 92 refer to post scalers for post scaling the transformed digital signals which may respectively be red, green, blue, black, and the special color or cyan, magenta, yellow, black and the special color, as the case may be.

Each of the tables 70, 72, 74 and 76, 78, 80 comprises a look-up table to provide coarse values, and an interpolator to refine the coarse values.

A model for the way printing ink densities add on paper is used to generate the look-up tables 70, 72, 74 and 76, 78, 80. The particular model used in the present example for calculating the look-up tables is the cross product approximation for additivity failure in inks.

Thus, for the cyan channel:

$$C_1 = C_0 + C_k - a \times C_0 \times C_k$$

where,
$C_1$ is the output cyan value in percent dot;
$C_0$ is the input cyan value in percent dot;
$C_k$ is the input cyan component of black in percent dot; and
a is a constant.

The term "percent dot" refers to the numerical value of the color expressed as a percentage.

Similar equations are used for magenta and yellow, respectively, as follows:

$$M_1 = M_0 + M_k - a \times M_0 \times M_k$$

$$Y_1 = Y_0 + Y_k - a \times Y_0 \times Y_k$$

It will be appreciated that any other or more accurate model to correct for additivity failure in printing inks can be used for calculating the look-up tables. In an application where a more complex model is required which does not fit into the hardware structure of the present example, a three- or four-dimensional look-up table and interpolator can be used, instead of the two dimensional look-up tables and interpolator as shown.

Figure 9:
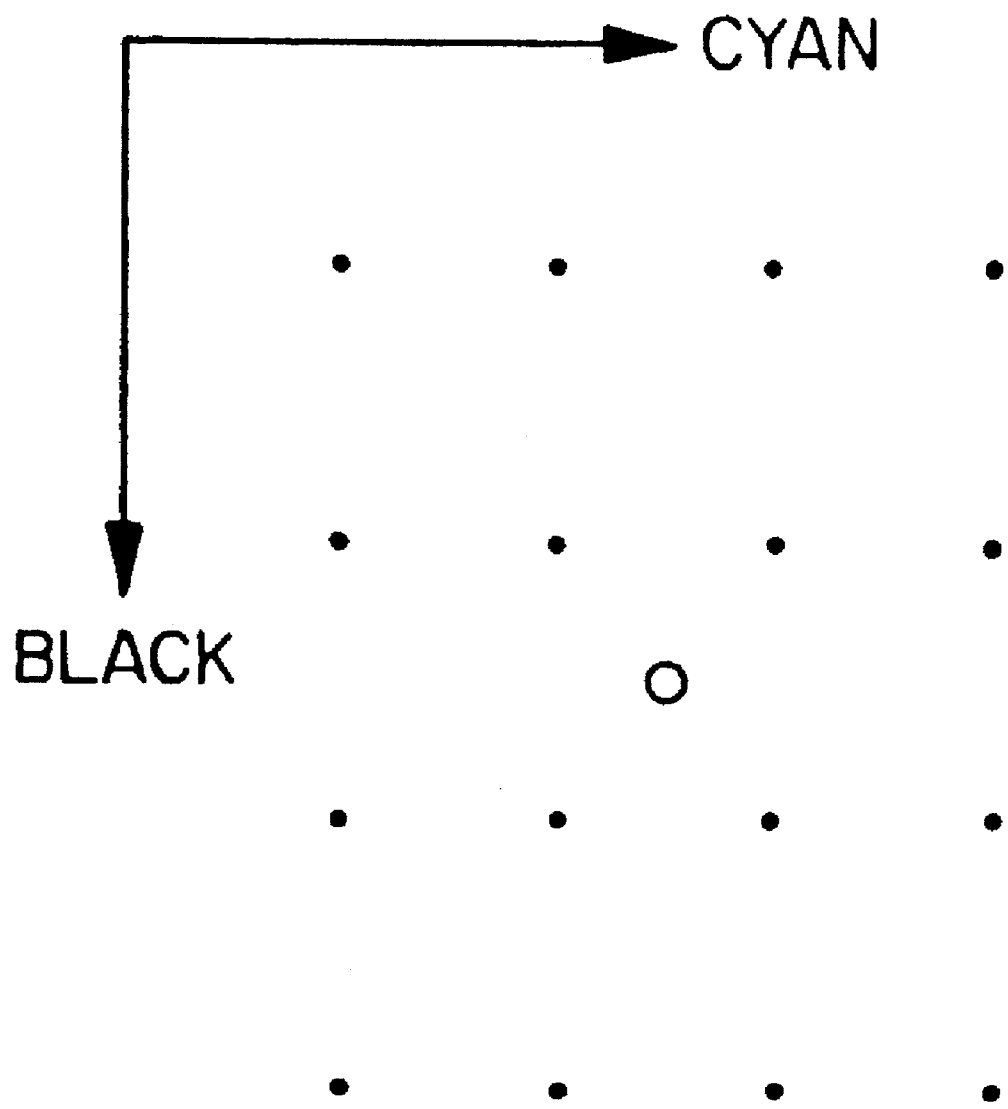
FIG. 9 is an illustration of an interpolation algorithm used in the color conversion method according to the invention.

In the present example, the two-dimensional look-up table in interpolator 70 takes the top n bits of $C_0$ and the top m bits of $K_0$ as an address into the two-dimensional look-up table. ($K_0$ is the input black value in percent dot.) This address is then incremented to find the four or sixteen points surrounding the input data, as shown in FIG. 9.

The bottom bits of C and K are used with bi-linear or bi-cubic interpolation algorithms to calculate an output value $C_1$, which is used as input in the table 76 with $S_0$ (the input special color value in percent dot). The table 76 again comprises a two-dimensional look-up and interpolation stage. Similar equations as those above are used for calculating the second stage look-up tables 76, 78, 80, except that the values $C_0$, $M_0$, $Y_0$ will now represent the output values from the tables 70, 72 and 74, respectively. This process can be repeated for as many dependent colors as required. Alternatively, if enough memory is available, a direct two-dimensional look-up table could be used. For example, two 8-bit numbers generate a 16-bit address which implies that a two-dimensional look-up table with 65,536 points could be directly used with no interpolation required.

By modelling the printing process as described above, the color transform is, therefore, insensitive to the level or type of black extraction algorithm used.

While only preferred embodiments of the invention have been described herein in detail, the invention is not limited thereby and modifications can be made within the scope of the attached claims.

What is claimed is:

1. A method of transforming three independent input vectors representing independent colors and one or more dependent input vectors representing dependent colors, in an original vector space, to three independent vectors in an image vector space, comprising the steps of:

(a) resolving each dependent input vector into three independent vector components corresponding with said independent input vectors;

(b) combining each independent vector with the corresponding independent vector component of a selected first one of said dependent input vectors according to a predetermined correction model to correct for additivity failure in printing inks to obtain a first output value for each independent color;

(c) combining each of said first output values with the corresponding independent vector component of a selected second one of said dependent input vectors according to said correction model to obtain a second output value for each independent color;

(d) repeating step (c) until all said dependent vectors are exhausted to obtain a final output value for each independent color to form a reduced set of three independent vectors; and (e) inputting said reduced set of three independent vectors into a three-dimensional look-up table for three-dimensional original vector space input data and containing three-dimensional image vector space output data to obtain the said three independent vectors in the image vector space.

2. A method of transforming three independent input vectors representing independent colors and one or more dependent input vectors representing dependent colors, in an original vector space, to three independent and one or more dependent vectors in an image vector space in real time, comprising the steps of:

(a) resolving each dependent input vector into three independent vector components corresponding with said independent input vectors;

(b) combining each independent vector with the corresponding independent vector component of a selected first one of said dependent input vectors according to a predetermined correction model to correct for additivity failure in printing inks to obtain a first output value for each independent color;

(c) combining each of said first output values with the corresponding independent vector component of a selected second one of said dependent input vectors according to said correction model to obtain a second output value for each independent color;

(d) repeating step (c) until all said dependent vectors are exhausted to obtain a final output value for each independent color of an intermediate vector space; and (e) compiling a look-up table ahead of time, for intermediate vector space input data in the form only of independent vectors and containing image vector space output data in the form of independent and dependent vectors; and (f) inputting said intermediate vector space vectors into said look-up table, in real time, to obtain said image vector space vectors.

3. The method according to claim 1 or 2 wherein said correction model comprises a cross product approximation for additivity failure in inks according to the formula:

$$A_1 = A_0 = A_k - a \times A_0 \times A_k$$

where, $A_1$ is the first output value for an independent color A;

$A_0$ is the input value for independent color A;

$A_k$ is the corresponding independent vector component of a selected dependent input vector; and a is a constant.

4. Apparatus for transforming three independent input vectors representing independent colors and one or more dependent input vectors representing dependent colors, in an original vector space, to three independent vectors in an image vector space, comprising:

means for resolving each dependent input vector into three independent vector components corresponding with said independent input vectors;

means for combining each independent vector with the corresponding independent vector component of a selected first one of said dependent input vectors according to a predetermined correction model to correct for additivity failure in printing inks to obtain an intermediate output value for each independent color;

means for sequentially combining said intermediate output values with the corresponding independent vector component of selected further ones of said dependent input vectors according to said correction model to obtain further sequential output values for each independent color until all said dependent vectors are exhausted to form a reduced set of three independent vectors; and transformation circuitry which comprises a look-up table for transforming the reduced set of three independent vectors to three independent vectors in an image vector space.

5. Apparatus for transforming three independent input vectors representing independent colors and one or more dependent input vectors representing dependent colors, in an original vector space, to three independent and one or more dependent vectors in an image vector space in real time, comprising:

means for resolving each dependent input vector into three independent vector components corresponding with said independent input vectors;

means for combining each independent vector with the corresponding independent vector component of a selected first one of said dependent input vectors according to a predetermined correction model to correct for additivity failure in printing inks to obtain an intermediate output value for each independent color;

means for sequentially combining said intermediate output values with the corresponding independent vector component of selected further ones of said dependent input vectors according to said correction model to obtain further sequential output values for each independent color until all said dependent vectors are exhausted to form a reduced set of three independent vectors of an intermediate vector space; and transformation circuitry which comprises a look-up table for transforming the reduced set of three independent vectors to independent and dependent vectors in an image vector space.

6. The apparatus according to claim 4 or 5 wherein said correction model comprises a cross product approximation for additivity failure in inks according to the formula:

$$A_1 = A_0 + A_k - a \times A_0 \times A_k$$

where, $A_1$ is the first output value for an independent color A;

$A_0$ is the input value for independent color A;

$A_k$ is the corresponding independent vector component of a selected dependent input vector; and a is a constant.

7. The apparatus according to claim 4 or claim 5 wherein said means for resolving each dependent input vector into an independent vector component and said means for combining said independent vector component with the corresponding independent input vector comprises a two-dimensional look-up table for receiving input values of said dependent and independent vectors, said look-up table being loaded with said correction model to correct for additivity failure in printing inks.

* * * * *